US012030169B1

(12) United States Patent
Sjöblom

(10) Patent No.: US 12,030,169 B1
(45) Date of Patent: Jul. 9, 2024

(54) POWER TOOL

(71) Applicant: ATLAS COPCO INDUSTRIAL TECHNIQUE AB, Stockholm (SE)

(72) Inventor: Torbjörn Sjöblom, Johanneshov (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/558,036

(22) PCT Filed: Apr. 8, 2022

(86) PCT No.: PCT/EP2022/059453
§ 371 (c)(1),
(2) Date: Oct. 30, 2023

(87) PCT Pub. No.: WO2022/238061
PCT Pub. Date: Nov. 17, 2022

(30) Foreign Application Priority Data

May 10, 2021 (SE) .................................... 2130126-2

(51) Int. Cl.
*B25F 5/02* (2006.01)
*B25G 1/12* (2006.01)

(52) U.S. Cl.
CPC . *B25F 5/02* (2013.01); *B25G 1/12* (2013.01)

(58) Field of Classification Search
CPC .................................... B25G 1/12; B25F 5/02
See application file for complete search history.

(56) References Cited

U.S. PATENT DOCUMENTS

| | | | |
|---|---|---|---|
| 9,931,118 | B2 | 4/2018 | Shelton, IV et al. |
| 2008/0196910 | A1 | 8/2008 | Radle et al. |
| 2013/0193891 | A1 | 8/2013 | Wood et al. |
| 2015/0314434 | A1 | 11/2015 | Bevins, Jr. et al. |
| 2015/0340921 | A1 | 11/2015 | Suda et al. |
| 2019/0043292 | A1 | 2/2019 | Hoossainy et al. |

(Continued)

FOREIGN PATENT DOCUMENTS

| | | | |
|---|---|---|---|
| CN | 110337735 | A | 10/2019 |
| EP | 3641047 | A1 | 4/2020 |
| WO | 2019211048 | A1 | 11/2019 |

OTHER PUBLICATIONS

Atlas Copco Industrial Technique AB, International Patent Application No. PCT/EP2022/059453, International Search Report, Jul. 25, 2022.

(Continued)

*Primary Examiner* — Daniel Jeremy Leeds

(74) *Attorney, Agent, or Firm* — Moore & Van Allen PLLC; W. Kevin Ransom

(57) ABSTRACT

Disclosed herein is a power tool comprising a motor unit comprising a motor and a drive axle connected to the motor, a battery unit configured to receive a battery and a handle unit interconnecting the motor unit and the battery unit, the handle unit comprising: a frame extending from the motor unit to the battery unit; a control button mounted to the frame for controlling the power tool; a circuit board mounted to the frame and connected to the control button; cables interconnecting the battery unit, the circuit board and the motor unit; an antenna connected to the circuit board for communication of the power tool with external devices; a pair of outer handle covers for covering the handle unit; wherein the frame is made of an electrically conductive material.

14 Claims, 4 Drawing Sheets

(56) References Cited

U.S. PATENT DOCUMENTS

| | | | |
|---|---|---|---|
| 2019/0372182 | A1 | 12/2019 | Takayasu |
| 2020/0376645 | A1 | 12/2020 | Davis et al. |

OTHER PUBLICATIONS

Atlas Copco Industrial Technique AB, International Patent Application No. PCT/EP2022/059453, Written Opinion, Jul. 25, 2022.

Atlas Copco Industrial Technique AB, International Patent Application No. PCT/EP2022/059453, International Preliminary Report on Patentability, Feb. 27, 2023.

Atlas Copco Industrial Technique AB, Swedish Patent Application No. 2130126-2, Swedish Search Report, Dec. 2, 2021.

POWER TOOL

CROSS-REFERENCE TO RELATED APPLICATIONS

This application is a National Stage Patent Application (filed under 35 § U.S.C. 371) of PCT/EP2022/059453, filed Apr. 8, 2022, of the same title, which, in turn claims priority to Swedish Patent Application No. 2130126-2 filed May 10, 2021, of the same title; the contents of each of which are hereby incorporated by reference.

Field of the Invention

In a first aspect the invention relates to the field of power tools such as for example pistol tools or other handheld tools for assembly lines and industrial applications. In a second aspect the invention also relates to the field of power tools in general even for hobby and building related applications.

Background of the Invention

The manufacturing and application of power tools such as pistol tools has certain challenges especially in industrial environments such as for example assembly factories. Such factories typically have electromagnetic compatibility (EMC) and electrostatic discharge (ESD) standards that need to be followed and fulfilled. If they are not fulfilled problems with workers, for instance workers who have a pacemaker, or problems with sensitive equipment in general and sensitive assembly components can occur. In view of these EMC and ESD standards, power tools are today grounded via a cable if they are cable connected tools or they are grounded when connected to a controller that is close to the assembly area, which controller has ground level and therewith provides the same ground level to the tool. One issue that thereby occurs is that the tools or power tools do not have the same ground level across the entire tool due to the extensive use of plastic materials in the actual tool, which plastic electrically isolates several parts, such as for example the motor and the battery adapter, from one another leading to different ground levels in one and the same tool. Especially the handle part of the tool is widely made of plastic and therewith the motor unit and the battery adapter and the battery do not have the same ground level, which leads to problems with EMC and ESD standards since it is not entirely sure what kind of ground level the different parts of the tool have. One solution for this has been to introduce two metal plates into the shell of the handle on both inner sides of it, whereby the metal plates extend from the battery adapter to the motor unit. These metal plates are however cumbersome to install since they need to be bent at the edges and otherwise adapted and they are also difficult to assemble when the tool is produced and therewith make the tool expensive due the following:

Up to today the printed circuit boards (PCB), the controller, the buttons in particular the control button that controls the tool, the cables, the antennas and other components are pressed into one of two handle-shells and then the other handle shell is just pressed onto the first handle shell and screwed tight. The handle shells are typically left and right handle shells. One can imagine that this leads to quite some challenges and uncertainty as to where the actual components are placed once the handle is closed. These challenges are further increased when each handle shell needs to house a metal plate for providing the same ground level across the entire tool. In addition, it is cumbersome and expensive to provide metal plates that fit into the handle shells and do not destroy any other components such as cables or antennas. The assembly of the components within one shell of the handle makes it also very difficult to repair the power tool and replace components. Usually, the entire handle has to be disassembled, the component replaced and then the handle reassembled, which takes time and therewith leads to long down times of such power tools or pistol tools.

Another shortcoming with prior art power tools is that the connection or interface between handle and battery adapter and battery, respectively is rather rigid and stiff. When the power tool thus gets an impact, for example due to falling to the ground, it tends to break at the interface or intersection battery adapter and battery, respectively, and handle.

SUMMARY OF THE INVENTION

An object of the present invention is therefore to provide an improved power tool.

Another object of the present invention is to provide a power tool such as a pistol tool that is reliable, robust and easy to assemble.

The inventor of the present invention has discovered that the above-described challenges and problems with prior art power tools such as pistol tools can be overcome by providing a power tool having a battery unit, a handle unit and a motor unit, whereby the handle unit comprises a frame that interconnects the battery unit with the motor unit. The frame is thereby made of an electrically conductive material that is strong and robust, such as for example aluminum or conductive fiber, such as metal fiber, reinforced plastic. The advantage of such as solution is that the PCBs, the controller, the cables, the antenna, the communication unit and other components can be assembled to the frame and not into a handle shell. This leads to a cleanly assembled power tool that has the same ground level over the entire tool. By providing an adapter between the frame and the battery unit, which adapter is capable of absorbing shocks and impacts, whereby the adapter is also made of an electrically conductive material such as aluminum, steel or metal fiber, reinforced plastic, it is further possible to make the power tool resistant to destruction at the handle—battery unit interface. The inventor has further realized that this resistance to destruction can further be increased when inner handle covers and outer handle covers with different amounts of glass fibers embedded in plastic are provided, whereby the inner handle covers are made less stiff than the outer handle covers.

Disclosed herein is a power tool for example a pistol tool or any other hand held power tool comprising a motor unit comprising a motor and a drive axle connected to the motor, a battery unit configured to receive a battery and a handle unit interconnecting the motor unit and the battery unit, the handle unit comprising:

- a frame extending from the motor unit to the battery unit;
- a control button mounted to the frame for controlling the pistol tool;
- a printed circuit board mounted to the frame and connected to the control button;
- cables interconnecting the battery unit, the printed circuit board and the motor unit;
- an antenna connected to the printed circuit board for communication of the pistol tool with external devices;
- a pair of outer handle covers for covering the handle unit;
- characterized in that the frame is made of a an electrically conductive material that is strong and impact resistant.

In such an embodiment the frame provides a basis for the mounting of all other components in the handle and at the same time the frame provides one and the same ground level across the entire tool from the motor unit to the battery unit and the battery when the battery is coupled. Thus the frame serves as mounting platform for the other components in the handle unit.

Since the frame provides the basis for mounting the components one of the outer handle cover can be removed and all the components stay cleanly and neatly in place, which facilitates maintenance and repair of the pistol tool.

In an embodiment the frame may be made of a metal such as aluminium, steel or titan or of an electrically conductive fiber reinforced plastic.

All of these materials are electrically conductive and therefore they enable the grounding of the entire power tool.

In an embodiment the handle unit may further comprise an adapter that is connected to the frame and the battery unit, whereby the adapter is electrically conductive and designed to have shock absorbing capabilities.

The adapter may be integrally formed with the frame or the battery unit or both. The adapter helps to reduce the risk of a pistol tool breaking at the interface handle unit—battery unit in case of a fall for instance.

In an embodiment the adapter may also be made of a metal such as aluminium, steel or titan or electrically conductive fiber reinforced plastic.

This helps that the conductivity is established from motor unit to the battery unit.

In another embodiment the adapter may comprise a longitudinal web and at least one arch-shaped element connected to the longitudinal web and the adapter may comprise an electrically conductive adapter—battery unit fastening mechanism and an electrically conductive adapter—frame fastening mechanism.

The above design of the adapter helps to improve the shock absorbing properties of the adapter and ensures a good and reliable connection to the handle unit and the battery unit, respectively.

The adapter may comprise two arch-shaped elements and one web or two webs and two arch-shaped elements for improved stability and reliability.

In an embodiment the frame may comprise a frame—motor unit fastening mechanism and a frame—adapter fastening mechanism, wherein the frame—motor unit fastening mechanism and the frame—adapter fastening mechanism are electrically conductive, said mechanisms being used for connecting the frame to the motor unit and the adapter and therewith the battery unit.

These fastening mechanisms provide a reliable and strong connection between handle unit and motor unit and handle unit and battery unit and adapter, respectively. At the same time the fastening mechanisms are electrically conductive for providing one and the same ground level across the entire pistol tool.

In an embodiment the handle unit further may further comprise a pair of inner handle covers configured to be arranged around the frame and printed circuit board and configured to be arranged on an inner side of the pair of outer handle covers.

The pair of inner handle covers are made of glass fiber reinforced plastic comprising 20% to 30% by weight glass fibers and wherein the pair of outer handle covers are made of glass fiber reinforced plastic comprising 25% to 35% by weight glass fibers.

The pair of inner handle covers may further improve the shock resistance of the pistol tool. In particular if the amount of glass fibers is chosen to be less in percentage by weight as in the pair of outer handle covers, then the distribution of the shock or load is improved in case of an impact, since the pair of inner handle covers are allowed to be deformed with less force or shock than the pair of outer handle covers which leads to an optimized load distribution and therewith a higher shock resistance.

In an embodiment the frame may further comprise a bolt opening configured to receive a bolt for fastening the printed circuit board and the pair of inner handle covers, the bolt being made of electrically conductive material and configured to physically touch the printed circuit board.

The bolt may be advantageous for a clean and robust assembly at the same time it may provide grounding to the printed circuit board. This grounding may alternatively be provided via an electrically conductive sleeve that is arranged around the bolt.

In an embodiment at least one of the pair of inner handle covers comprises a channel for receiving and embedding cables.

This will lead to a better and safer arrangement of the cables and therewith to a more durable pistol tool.

In an embodiment the frame may comprise a receiving cavity for mounting the control button.

Such a receiving cavity facilitates the replacement of the control button in case it breaks. The control button and its trigger, respectively, may be fastened via a splint or the like in a trigger adapter, which is embedded via a spring in the receiving cavity. Removing the splint will allow to easily replace the control button. Other solutions may of course be used but the receiving cavity also facilitates assembly of the control button.

In an embodiment the handle unit may further comprise an insulation and protection element that is connected to the frame in between the frame and the printed circuit board.

This insulation and protection element may be made of an electrically insulating and rather soft material so that it can protect the printed circuit board and other sensitive electric components from electric discharges or shocks or the like.

In an embodiment the outer handle cover may extend from the motor unit to the battery unit.

This provides for a stable covering of the handle unit.

Electrically conductive and strong material—Herein the term “electrically conductive and strong material” generally means either some type of metal such as aluminium, steel, titan or an alloy thereof or fiber reinforced plastic, whereby the fibers may be electrically conductive carbon fibers or metal fibers.

Fastening mechanism—Herein the term “fastening mechanism” refers generally to thread, bolt, hole and screw combinations for fastening components to one another. Other fastening mechanisms such as form fit or force fit connections and even adhesive induced connections or electrically conductive adhesive induced connections are covered by this term.

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Figure 1:
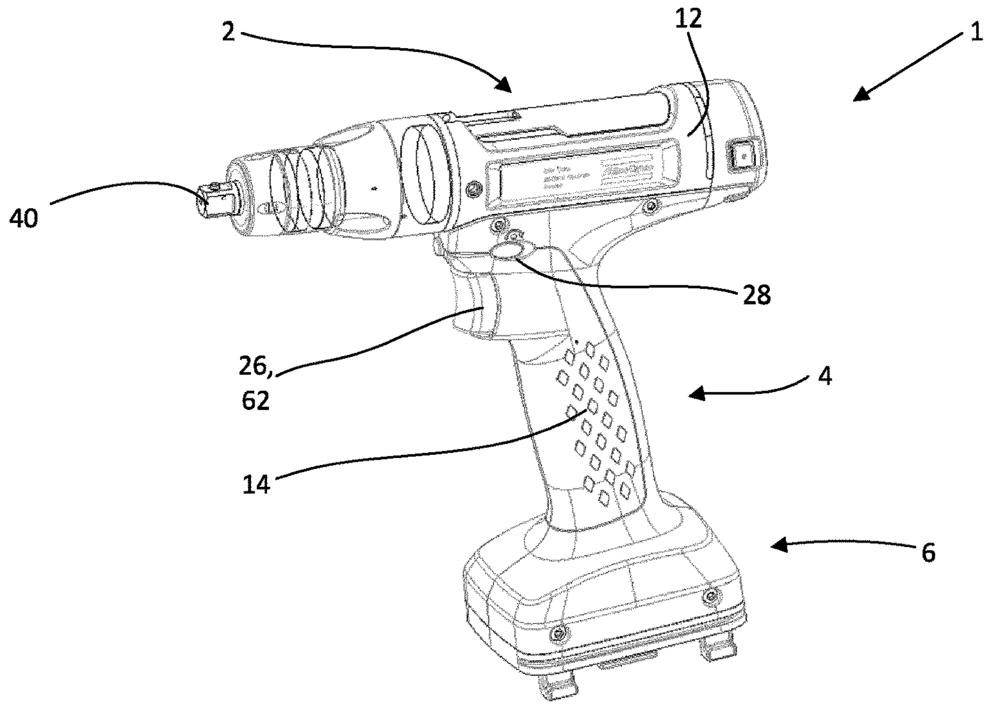
FIG. 1 schematically illustrates in a perspective view a pistol tool according to the invention.
Figure 2:
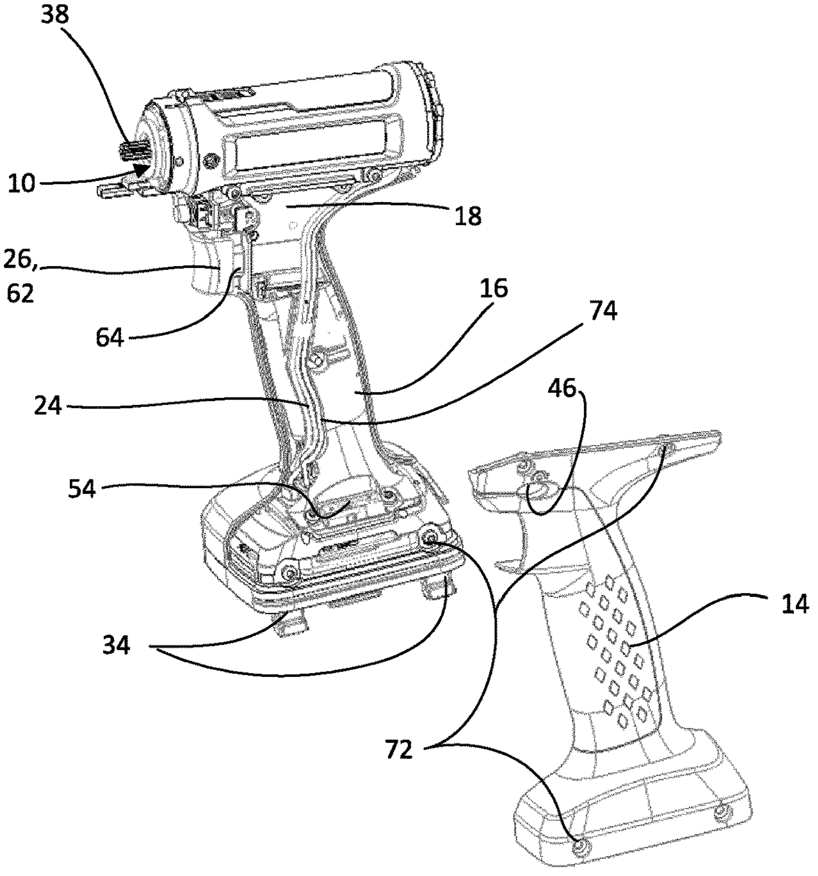
FIG. 2 schematically illustrates in a perspective view the pistol tool of FIG. 1 with certain parts removed for better illustration of features.

FIG. 1 illustrates a pistol tool 1 having a motor unit 2, handle unit 4 and a battery unit 6. The pistol tool 1 is shown without a battery, it is however clear that a battery can be coupled to the battery unit 6. The motor unit 2 comprises a motor housing 12 and a motor 10 (c.f. FIG. 2). The motor 10 is driving a drive axle 38 (c.f. FIG. 2) having a bit connector 40. The handle unit 4 comprises a reverse button 28 to change the rotational direction of the motor and therewith the axle 38 and the bit connector 40, respectively. Then handle unit 4 further comprises a control button 26 with a trigger 62 and a pair of outer handle covers 14 arranged to cover the handle unit 4. The pair of outer handle covers 14 extend from the motor unit 2 to the battery unit 6 and are fastened to the motor unit 2 and the battery unit 6 via an outer handle cover fastening mechanism 72, as shown in FIG. 2. The outer handle cover fastening mechanism 72 comprises of a thread-hole, screw bolt and hole combination as illustrated in FIGS. 1 and 2.

Turning now to FIG. 2, which shows the same pistol tool 1 as FIG. 1 but with removed front cap and bit adapter and also with a removed, left, outer handle cover 14. The pair of outer handle covers 14 each comprise a reverse button recess 46 that extends through the outer handle covers 14. The reverse button recess 46 is also formed in a frame 18 of the handle unit 4, which frame 18 holds a printed circuit board (FIG. 6) and other components as further explained herein.

Figure 6:
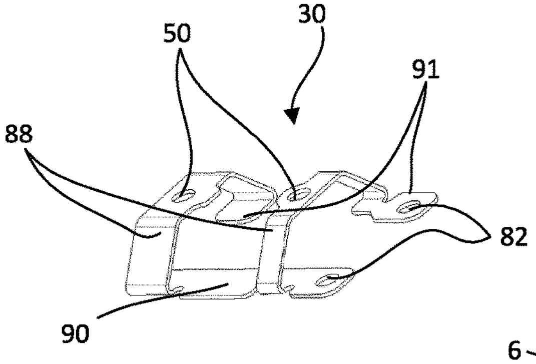
FIG. 6 schematically illustrates in a perspective view an adapter for connection of a handle unit to a battery unit.

The frame 18 illustrated in FIG. 2 extends from the motor unit 2 down to the battery unit 6 and is made of an electrically conductive material to provide the same ground level across the entire pistol tool 1. Illustrated is also the control button 26 with its trigger 62 that sits in a trigger adapter 64. FIG. 2 further illustrates a pair of inner handle covers 16 of the handle unit 4, at least one of the inner handle covers 16 of said pair of inner handle covers 16 comprising a cable channel 74 comprising cables 24 interconnecting the motor unit 2 with the handle unit 4 and its printed circuit board (c.f. FIG. 6) and the battery unit 6. The cables 24 further connect the antennas 54, arranged on both sides of the handle unit 4 with the printed circuit board and controller (not shown in FIG. 2). The battery unit 6 comprises battery receivers 34 for receiving a battery in a form-fit manner, for instance a slide and lock mechanism. As mentioned in the introductory part, the pair of outer handle covers 14 are made of 25% to 35% glass fibers, preferably 30%, glass fibers embedded in plastic whereby the percentage relates to weight—percentages and the pair of inner handle covers 16 are made of 20% to 30%, preferably 25%, glass fiber embedded plastic. This differing amount of glass fiber leads to an optimal distribution of load in case of shocks and impacts and/or deformations in the pistol tool 1.

Figure 3:
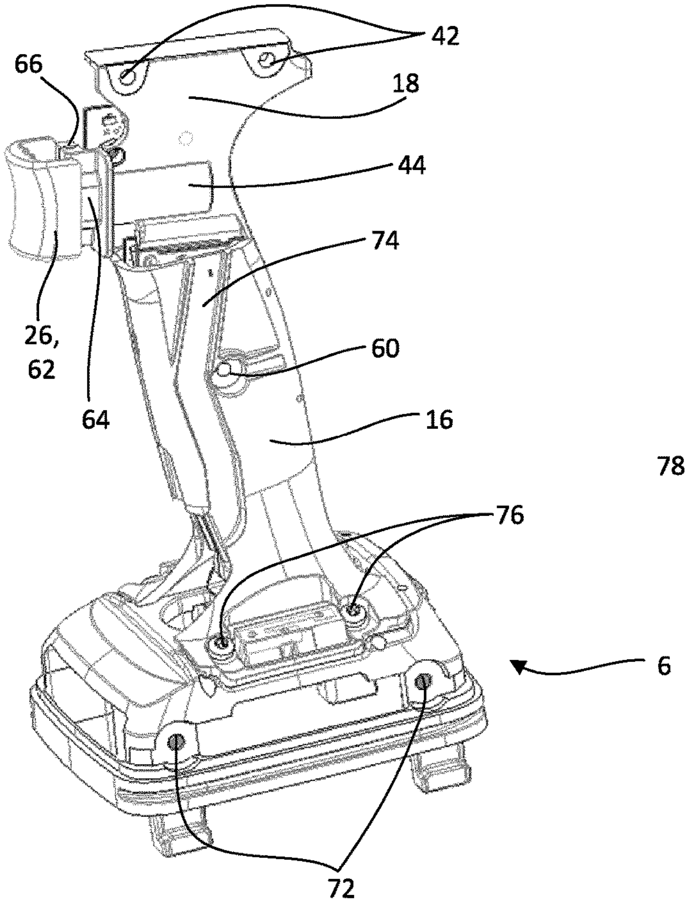
FIG. 3 schematically illustrates in a perspective view the pistol tool according to FIG. 2 with even more parts removed for still better illustration of features.
Figure 9:
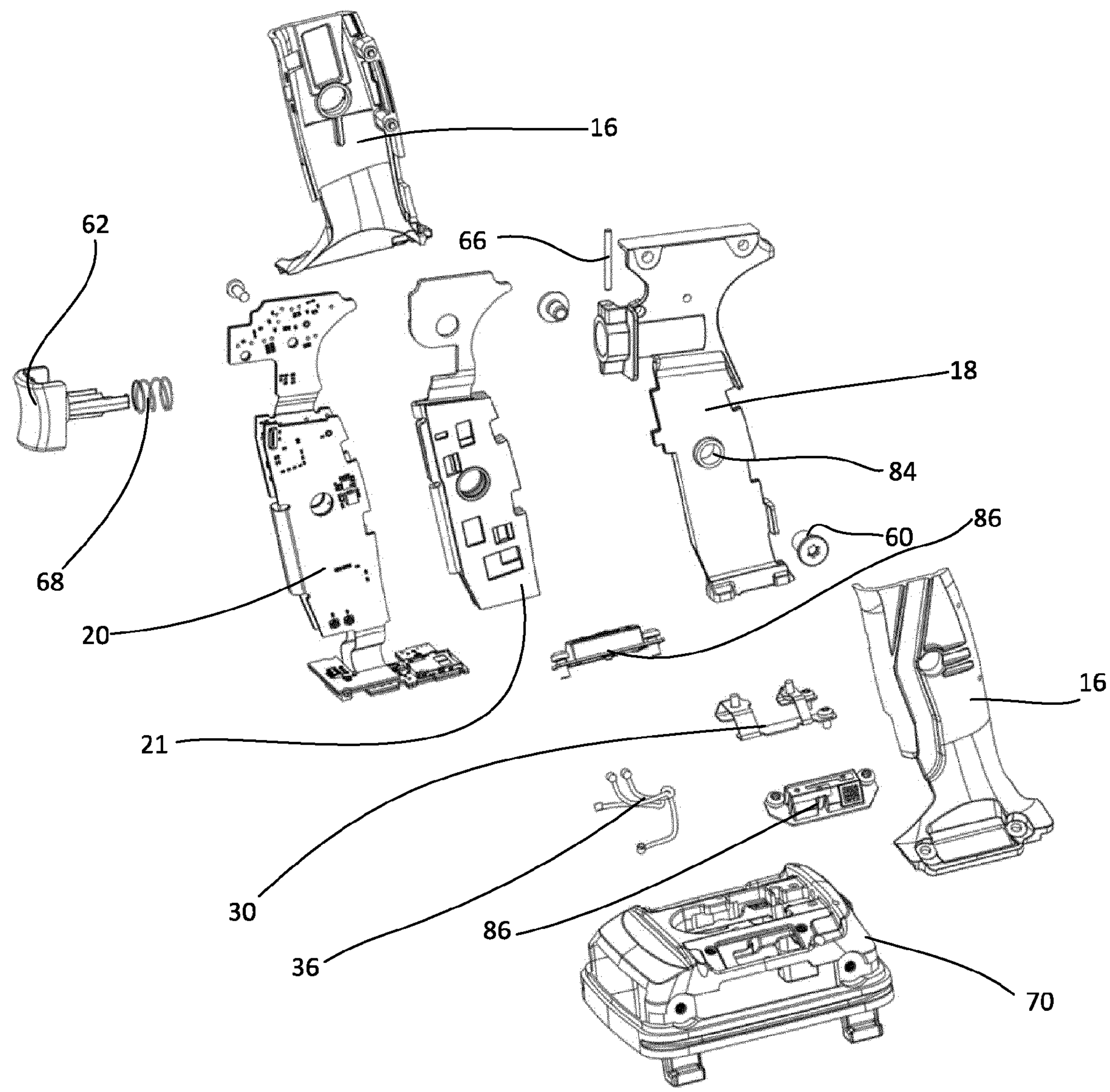
FIG. 9 schematically illustrates in an explosion illustration the handle unit and the battery unit.

Turning now to FIG. 3, which illustrates, in more detail, some additional features of the pistol tool 1 according to the invention. The frame 18 comprises a frame motor unit fastening mechanism 42 and a receiving cavity 44 for receiving the control button 26 with its trigger 62 and trigger adapter 64. The frame motor unit fastening mechanism 42 comprises of an electrically conductive bolt, thread hole and hole combination. The trigger 62 is locked in the trigger adapter 64 via a splint 66, which splint also makes it easier to replace the trigger 62 in case it is damaged. In the receiving cavity 44 a spring (not visible in FIG. 3, c.f. FIG. 9) is embedded that pushes the control button 26 away from the receiving cavity 44. The frame 18 has an upper part that is wider than the width at the actual handle of the handle unit 4. The frame 18 is further made of aluminum and is basically a spline or metal spline.

FIG. 3 further illustrates the inner handle cover 16, whereby at least the left inner handle cover 14 comprises a cable channel 74 for, illustrated without cables inside in FIG. 3, for receiving the cables hold them tidy in place during assembly and afterwards. The pair of inner handle covers 16 are fastened to the battery unit 6 via an inner handle cover fastening mechanism 76, which again comprises a thread hole, bolt and hole combination. The thread holes of the outer handle cover fastening mechanism 72 is also visible in FIG. 3 as well as a bolt 60 for fastening the pair of inner handle covers 16 to the frame 18. This bolt 60 also helps to keep the printed circuit board in position and connected to the frame 18.

Figure 4:
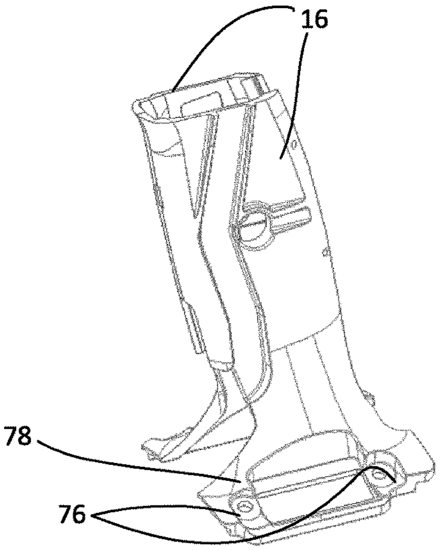
FIG. 4 schematically illustrates in a perspective view a pair of inner handle covers of the pistol tool.

FIG. 4 illustrates the pair of inner handle covers 16 comprising a foot part 78 where the inner handle cover fastening mechanism 76 is located.

Figure 5:
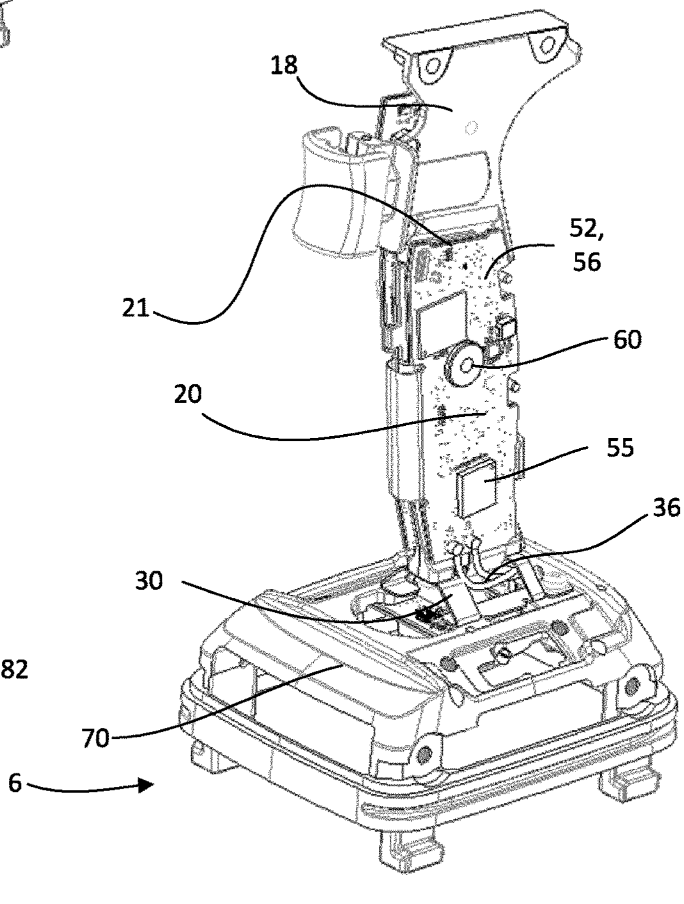
FIG. 5 schematically illustrates in a perspective view the pistol tool according to FIG. 3 with removed inner handle covers.

FIG. 5 illustrates the frame 18 of the handle unit 4 clearer since the pair of inner handle covers 16 are not shown. Mounted on the frame 18 is the printed circuit board 20 or circuit board 20 comprising various circuit 52 and a communication unit 56. The circuit board 20 also comprises a computer processing unit (CPU) 55, it is mounted to the frame 18 via the bolt 60 and it is connected to the battery unit 6 via cables 36. The bolt 60 is also providing a grounding function since it electrically connects the frame 18 with the circuit board 20 via a sleeve 84, as shown in FIG. 9. In between the circuit board 20 and the frame 18 an insulation and protection element 21 (c.f. FIG. 9) is arranged. The protection and insulation element 21 is made of rubber or another suitable material that electrically insulates the circuit board 20 from the frame 18 and the insulation and protection element 21 also works as cushion to protect the circuit board 20 from shocks and other physical impacts. The frame 18 is connected to the battery unit 6 via an adapter 30, which is also illustrated in FIG. 6. The adapter 30 is made of an electrically conductive material, such as metal like aluminum, titan or steel or plastic reinforced with electrically conductive fibers. The adapter 30 is designed as a shock absorbing element that can absorb shocks when the pistol tool 1 falls down or gets another impact via the battery unit 6 when the battery is connected. The frame 18 is connected to the adapter 30 via an adapter-frame fastening mechanism 50 and the adapter 30 is connected to the battery unit 6 via an adapter-battery unit fastening mechanism 82. The adapter 30 is connected to the battery unit 6 via a battery unit housing 70.

FIG. 6 illustrates the adapter 30 in more detail. The adapter 30 comprises a longitudinal web 88 and two arch shaped elements 90. The arch shaped elements 90 are integrally connected to the web 88. On the sides where the arch shaped elements 90 are not connected to the web 88 they comprise feet 91 that ease the mounting of the adapter 30 and increase stability when the adapter 30 is mounted. On the highest point of the arch shaped elements 90 the holes of the adapter-frame fastening mechanism 50 are shown, said holes being designed for receiving a screw or bolt of the adapter-frame fastening mechanism 50. On one end of the web 88 a hole of the adapter-battery unit fastening mechanism 82 is shown, said hole being for receiving a screw or bolt of the adapter-battery unit fastening mechanism 82. The other hole of the adapter-battery unit fastening mechanism 82 is shown on one of the feet 91 of the arch shaped element 90. FIG. 6 shows an exemplary embodiment of the adapter 30 it is however clear that other solutions and designs are possible. The holes and the arch shaped elements 90 may be arranged differently or the adapter 30 may comprise only one or several arch shaped elements 90. In addition, the adapter may comprise two longitudinal webs 88 instead of one. The arch shaped elements 90 are however beneficial since they provide a capability to absorb shocks or the like.

Figure 7:
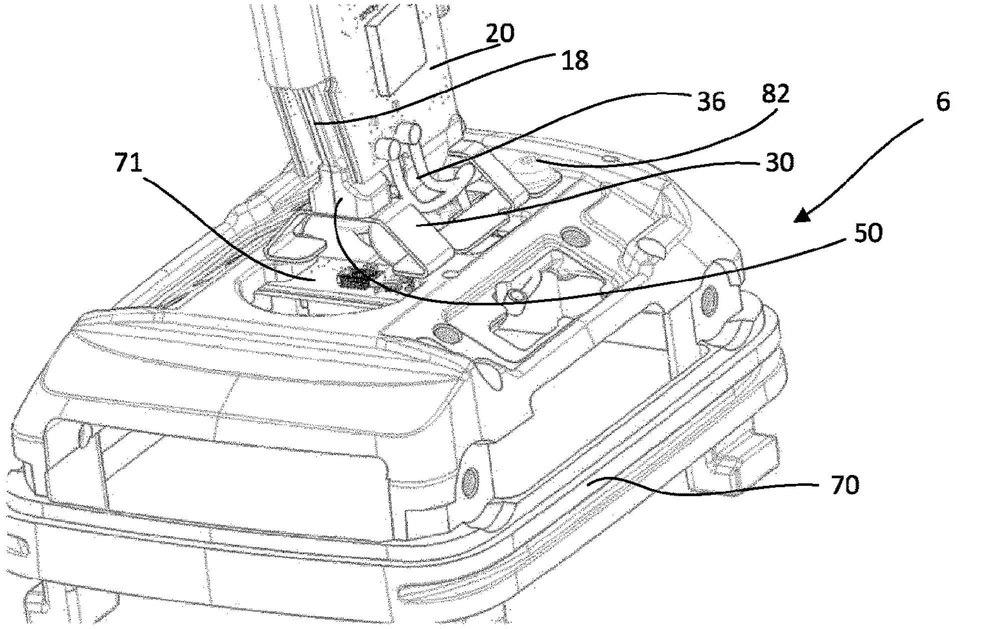
FIG. 7 schematically illustrates in a perspective view the connection handle unit—battery unit.

FIG. 7 illustrates a bigger perspective view of the battery unit 6 with the lower part of the handle unit 4 illustrated. The circuit board 20 mounted on the frame 18 is visible and also the adapter-frame fastening mechanism 50 that connects the frame 18 to the adapter 30. The cables 36 from the battery unit 6 are connected directly to the circuit board 20. The adapter 30 is fastened to the battery unit 6 via the adapter-battery unit fastening mechanism 82. The battery unit housing 70 comprises battery unit electronics 71, such as circuits and processors that are connected to the battery power ports and therewith the battery and the cables 3 that lead to the circuit board 20 of the handle unit 4. From FIG. 7 it becomes well visible how the interface handle unit 4—battery unit 6 is designed and how the adapter 30 provides shock protection. The adapter 30 and the frame 18 in the figures are made of aluminum to provide good stability and a light weight. Other materials are possible as described herein. It is also possible to choose different materials for the frame 18 and the adapter 30. The screws and bolts used for the fastening mechanism can likewise be made of aluminum or steel.

Figure 8:
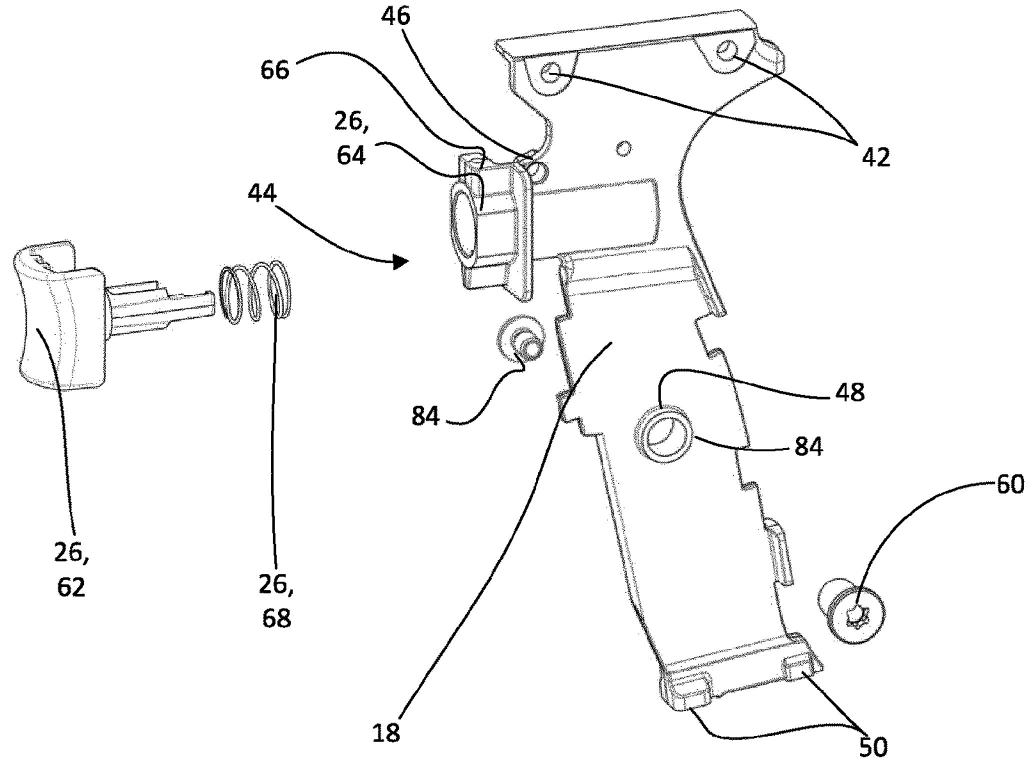
FIG. 8 schematically illustrates in a perspective view a frame with a control button.

FIG. 8 illustrates an explosion drawing of the frame 18 and the different components of the control button 26. The control button 26 comprises the trigger 62, the trigger adapter 64 that embeds and holds the trigger 62 via the splint 66 (c.f. FIG. 9) and a spring 68 that is embedded in the receiving cavity 44 for the control button in the frame 18. FIG. 8 further illustrates the reverse button recess 46 and the frame—motor unit fastening mechanism 42. The frame-motor unit fastening mechanism 42 comprises a part at an upper end of the frame 18 that is built stronger and sturdier than the rest of the frame 18. Typically this part at the upper part of the frame 18 is about 20% to 70% thicker than the rest of the frame 18. In a similar manner, a lower end of the frame 18, which lower end comprises of the adapter-frame fastening mechanism 50 is designed thicker and therewith sturdier than the rest of the frame 18 also with an increased thickness of about 20% to 70% thicker than the rest of the frame 18. The threaded holes for receiving bolts and/or screws are embedded in these parts of the upper end and the lower end of the frame 18. FIG. 8 further illustrates the bolt opening 48 for receiving the bolt 60 and its sleeve 84. The bolt opening 48 is also designed and foreseen in the circuit board 20 and the insulation and protection element 21 so that this components can be attached to the frame 18 via the bolt 60 and the sleeve 84.

FIG. 9 illustrates an explosion illustration of the handle unit 4 and the battery unit 6 of the pistol tool without the pair of outer handle covers 16. FIG. 9 however illustrates the inner handle covers 16, insulation and protection element 21, the frame 18, the circuit board 20, the battery housing 70, the trigger 62 of the control button 26 and a pair of antennas 86 used for communication with a factory network for example. The circuit board 20 may extend on both sides of the frame 18 as illustrated in FIG. 9 and it may also have a part that is embedded in the battery housing 70 when assembled. This part of the circuit board 20 that is embedded in the battery housing 70 when the pistol tool is assembled can for instance be positioned just below the adapter 30. FIG. 9 further illustrates how the circuit board 20 and the insulation and protection element 21 extend around the receiving cavity 44 for the control button. The trigger 62 and the trigger adapter 64 including the spring 68 and the splint 66 that holds the trigger 62 in the trigger adapter 64 are also well visible in FIG. 9. Pushing the trigger 62 will send a signal to the circuit board 20, for instance via a hall sensor, so that the circuit board 20 controls the motor unit 2 and the motor, respectively.

The antennas 86 are configured to be attached to the battery housing 70 on either side of the adapter 30. The pair of antennas 86 can thereby be directly connected to circuit board 20 of the pistol tool 1 or via the cables 36. FIG. 9 further illustrates the bolt 60 and the sleeve 84 for mounting the insulation and protection element 21, circuit board 30 and the inner handle covers 16 to the frame 18.

The frame has been illustrated as a plate-like element it is however clear the it can have another design and structure such as a truss or framework design or it may contain multiple holes for optimizing weight.

The invention has now been described and disclosed and its advantages have been explained according to an embodiment illustrated in the figures. Solutions that fall within the basic idea of providing an electrically conductive structure within a power tool or in particular a pistol power tool, which electrically conductive structure provides the same grounding level across the entire tool are herewith covered by the invention.

The invention claimed is:

1. A power tool comprising a motor unit comprising a motor and a drive axle connected to the motor, a battery unit configured to receive a battery and a handle unit interconnecting the motor unit and the battery unit, the handle unit comprising:

a frame extending from the motor unit to the battery unit;

a control button mounted to the frame for controlling the power tool;

a circuit board mounted to the frame and connected to the control button;

cables interconnecting the battery unit, the circuit board and the motor unit;

an antenna connected to the circuit board for communication of the power tool with external devices;

a pair of outer handle covers for covering the handle unit; and wherein the frame is made of an electrically conductive material; and wherein the handle unit further comprises an adapter that is connected to the frame and the battery unit, whereby the adapter is electrically conductive and designed to have shock absorbing capabilities.

2. The power tool according to claim 1, wherein the frame made of a metal or titanium or of an electrically conductive fiber reinforced plastic.

3. The power tool according to claim 1, wherein the adapter is made of a metal or an electrically conductive fiber reinforced plastic.

4. The power tool according to claim 1, wherein the adapter comprises a longitudinal web and at least one arch-shaped element connected to the longitudinal web and wherein the adapter comprises an electrically conductive adapter—battery unit fastening mechanism and an electrically conductive adapter—frame fastening mechanism.

5. The power tool according to claim 1, wherein the frame comprises a frame—motor unit fastening mechanism and a frame—adapter fastening mechanism, wherein the frame—motor unit fastening mechanism—and the frame—adapter fastening mechanism are electrically conductive, said mechanisms being used for connecting the frame to the motor unit and the adapter and therewith the battery unit.

6. The power tool according to claim 1, wherein the handle unit further comprises a pair of inner handle covers configured to be arranged around the frame and circuit board and configured to be arranged on an inner side of the pair of outer handle covers.

7. The power tool according to claim 6, wherein the pair of inner handle covers are made of glass fiber reinforced plastic comprising 20% to 30% by weight glass fibers and wherein the pair of outer handle covers are made of glass fiber reinforced plastic comprising 25% to 35% by weight glass fibers.

8. The power tool according to claim 6, wherein the frame further comprises a bolt and a bolt opening configured to receive said bolt for fastening the circuit board and the pair of inner handle covers, the bolt being made of electrically conductive material and configured to physically touch the circuit board.

9. The power tool according to claim 6, wherein at least one of the pair of inner handle covers comprises a channel for receiving and embedding cables.

10. The power tool according to claim 1, wherein the frame comprises a receiving cavity for mounting the control button.

11. The power tool according to claim 1, wherein the handle unit further comprise an insulation and protection element that is connected to the frame in between the frame and the circuit board.

12. The power tool according to claim 1, wherein the outer handle cover extends from the motor unit to the battery unit.

13. The power tool according to claim 1, wherein the frame is made of a metal selected from the group consisting of aluminum, steel, and titanium.

14. The power tool according to claim 1, wherein the adapter is made of a metal selected from the group consisting of aluminum, steel, and titanium.

* * * * *